No. 686,950.  
Patented Nov. 19, 1901.
J. PFLEGER.
METHOD OF MAKING CYANAMIDS.
(Application filed Mar. 15, 1901.)
(No Model.)
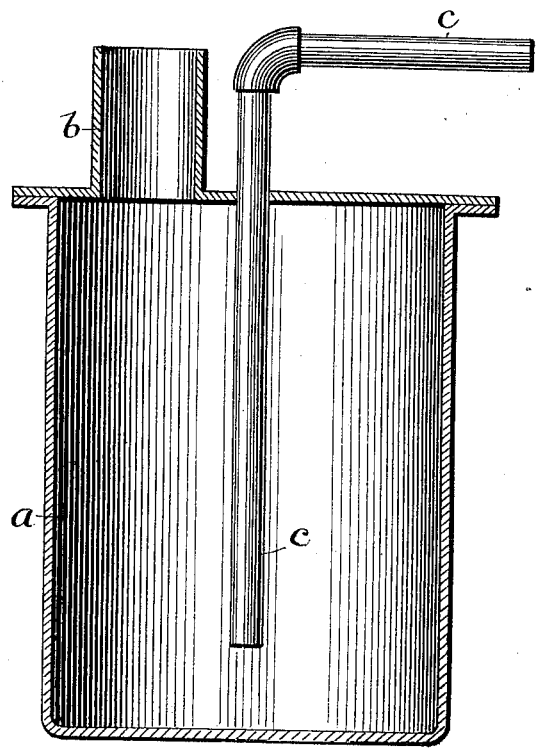
Witnesses  
Inventor  
Johannes Pfleger  
By  
Attorneys

UNITED STATES PATENT OFFICE.

JOHANNES PFLEGER, OF FRANKFORT-ON-THE-MAIN, GERMANY, ASSIGNOR TO THE FIRM OF DEUTSCHE GOLD & SILBER-SCHEIDE ANSTALT, VORM. ROESSLER, OF FRANKFORT-ON-THE-MAIN, GERMANY.

METHOD OF MAKING CYANAMIDS.

SPECIFICATION forming part of Letters Patent No. 686,950, dated November 19, 1901.

Application filed March 15, 1901. Serial No. 51,417. (No specimens.)

*To all whom it may concern:*

Be it known that I, JOHANNES PFLEGER, a subject of the Emperor of Germany, and a resident of 215 Gutleutstrasse, Frankfort-on-the-Main, Germany, have invented certain new and useful Improvements in the Manufacture of Cyanamids, of which the following is a specification.

In the specification of my application for Letters Patent, Serial No. 39,383, of the 10th of December, 1900, is described the manufacture of cyanamid by subjecting the cyanid of an alkali metal to the action of the amid of an alkali metal. I have since discovered another method of preparing cyanamid—for instance, dialkali cyanamid—which method is based upon the fact observed by me that at the comparatively low temperature of 300° to 400° centigrade carbon acts on the amid of an alkali metal in such a manner that the whole of the hydrogen of the amid is replaced by carbon in accordance with the following formula:

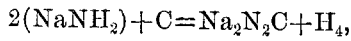

whereas at a higher temperature (about 800° centigrade) NaCy is formed directly from the amid of the alkali in accordance with the following formula:

In lieu of solid carbon—such, for instance, as charcoal—other carbonaceous substances—such, for example, as a carburet of hydrogen—may be used, which contain the carbon mechanically or chemically combined and are capable of yielding it up to the amid of the alkali, and thereby forming cyanamid.

The accompanying drawing shows a melting vessel in sectional elevation in which my process may be carried out.

In the drawing, *a* is the vessel, *b* the charging-opening, and *c* the tube, which may be used for passing ammonia into the vessel.

The process according to the present invention may be carried out in various ways. For example, as applied to the preparation of the disodium-cyanamid the proceeding may be as follows: Sodium amid, which may be prepared in the usual way, is melted in a suitable vessel, as shown in the accompanying drawing, and carbon added to it at about 350° centigrade. The reaction takes place at once with a brisk disengagement of hydrogen. As the melting-point of the sodium cyanamid is about 550° centigrade, the temperature must, as the cyanamid is being formed, be raised until it finally reaches between 550° and 600° centigrade, or sodium may be melted in a suitable crucible and the amount of carbon required for the formation of the cyanamid be introduced into the molten sodium and ammonia be passed through the mass. If the temperature on starting the operation be 400° centigrade and the temperature be gradually increased until it is slightly above the melting-point of the cyanamid, the carbon acts at once on the amid of the alkali metal as it is being formed. In this process cyanamid and no cyanid will be formed, and in the example given disodium cyanamid will be formed.

Other alkali metals may be used in place of sodium, the temperatures to be observed varying accordingly. Instead of solid carbon liquid or gaseous bodies containing carbon may be used, these latter being blown into the molten amid of the alkali metal or into the molten alkali metal itself.

I claim—

1. The process herein described of making cyanamid, which consists in reacting alkali amid with carbonaceous substances while maintaining the mass at a temperature suitable for the production of cyanamid, whereby cyanamid is formed from the above substances in accordance with the equation

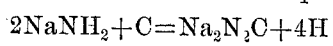

substantially as and for the purpose set forth.

2. The process herein described of making cyanamid, which consists in reacting alkali amid with carbonaceous substances while maintaining the mass at a temperature of about 350° to 600° centigrade, whereby cyanamid is formed from the above substances, substantially as and for the purpose set forth.

3. The process herein described of making cyanamid, which consists in reacting alkali amid with such proportions of carbonaceous substances and at a temperature of 350° to 600° centigrade as to produce cyanamid, substantially as and for the purpose set forth.

In testimony whereof I have signed my name to this specification in the presence of two subscribing witnesses.

JOHANNES PFLEGER.

Witnesses:
 JEAN GRUND,
 CARL GRUND.